United States Patent [19]
Cabasso et al.

[11] Patent Number: 5,989,742
[45] Date of Patent: Nov. 23, 1999

[54] BLEND MEMBRANES BASED ON SULFONATED POLY(PHENYLENE OXIDE) FOR ENHANCED POLYMER ELECTROCHEMICAL CELLS

[75] Inventors: Israel Cabasso; Youxin Yuan; Cortney Mittelsteadt, all of Syracuse, N.Y.

[73] Assignee: The Research Foundation of State University of New York, Albany, N.Y.

[21] Appl. No.: 08/725,747

[22] Filed: Oct. 4, 1996

[51] Int. Cl.⁶ .................................................. H01M 8/10
[52] U.S. Cl. ............................................. 429/33; 429/192
[58] Field of Search ....................................... 429/33, 192

[56] References Cited

U.S. PATENT DOCUMENTS

| | | |
|---|---|---|
| 3,226,361 | 12/1965 | Borman . |
| 3,259,592 | 7/1966 | Fox et al. . |
| 3,282,875 | 11/1966 | Connolly et al. . |
| 3,528,858 | 9/1970 | Hodgdon . |
| 4,175,153 | 11/1979 | Dobo et al. . |
| 4,268,278 | 5/1981 | Dobo et al. . |
| 4,329,157 | 5/1982 | Dobo et al. ............ 55/158 X |
| 4,330,654 | 5/1982 | Ezzell et al. . |
| 4,348,458 | 9/1982 | Otstot .................... 428/364 X |
| 4,654,055 | 3/1987 | Malon et al. . |
| 4,866,099 | 9/1989 | Hendy . |
| 5,348,569 | 9/1994 | Bikson et al. . |
| 5,364,454 | 11/1994 | Bikson et al. . |
| 5,422,411 | 6/1995 | Wei et al. . |
| 5,491,040 | 2/1996 | Charlonea-Giu ............ 429/192 |

FOREIGN PATENT DOCUMENTS

| | | |
|---|---|---|
| 574891 | 12/1993 | European Pat. Off. . |
| 31 43 804 | 12/1982 | Germany . |

OTHER PUBLICATIONS

Patent Abstracts of Japan, vol. 013, No. 145, Apr. 10, 1989.
Patent Abstracts of Japan, vol. 002, No. 059, Apr. 27, 1978.
Chemical Abstracts, vol. 104, No. 12, Mar. 24, 1986.
LCST Behavior in Polymer Blends by R.E. Bernstein et al., Macromolecules, vol. 10, No. 3 (Jun., 1997), pp. 681–686.
Selective Gas Transport in Miscible PPO–PS Blends by Y. Maeda et al., Polymers, vol. 26 (Dec. 1985), pp. 2055–2063.

*Primary Examiner*—John S. Maples
*Attorney, Agent, or Firm*—Morgan & Finnegan L.L.P.

[57] ABSTRACT

Solid polymer membranes comprised of a high charge density sulfonated poly (phenylene oxide) blended with poly(vinylidene fluoride) in varied ratios have improved membrane characteristics. These membranes possess very high ionic conductivity, are inexpensive and suitable for solid polymer electrolytes in electrochemical applications, especially for the polymer electrolyte membrane (PEM) fuel cell. PEM fuel cell assemblies with this membrane have enhanced performance.

14 Claims, 9 Drawing Sheets

BLEND MEMBRANES BASED ON SULFONATED POLY(PHENYLENE OXIDE) FOR ENHANCED POLYMER ELECTROCHEMICAL CELLS

FIELD OF THE INVENTION

This invention relates to a homogeneously sulfonated poly(phenylene oxide) and blends of the sulfonated poly(phenylene oxide) with poly(vinylidene fluoride), their use as ion exchange membranes in electrochemical cells such as solid polymer electrolyte fuel cells and processes for preparing the membranes. Further, this invention also relates to an improved solid polymer electrolyte fuel cell containing the novel blend membranes and a process for preparing the fuel cell.

BACKGROUND OF THE INVENTION

Fuel cells are electrochemical devices in which part of the energy of a chemical reaction is converted directly into direct current electrical energy. The direct conversion of energy into direct current electrical energy eliminates the necessity of converting energy into heat thereby avoiding the Carnot-cycle efficiency limitation of conventional methods of generating electricity. Thus, without the limitation of the Carnot-cycle, fuel cell technology offers the potential for fuel efficiencies two to three times higher than those of traditional power generator devices, e.g., internal combustion engines. Other advantages of fuel cells are quietness, cleanliness (lack of air pollution) and the reduction or the complete elimination of moving parts.

Typically, fuel cells contain two porous electrical terminals called electrodes with an electrolyte disposed therebetween. In the operation of a typical fuel cell, an oxidant is continuously introduced at the oxidant electrode (cathode) where it contacts the electrode and forms ions thereby imparting positive charges to the cathode. Simultaneously, a reductant is continuously introduced at the fuel electrode (anode) where it forms ions and leaves the anode negatively charged. The ions formed at the respective electrodes migrate in the electrolyte and unite while the electrical charges imparted to the electrode are utilized as electrical energy by connecting an external circuit across the electrodes. Fuel cell reactants are classified as oxidants and reductants on the basis of their electron acceptor or electron donor characteristics. Oxidants include pure oxygen, oxygen-containing gases (e.g., air) and halogens (e.g., chlorine). Reductants include hydrogen, carbon monoxide, natural gas, methane, ethane, formaldehyde and methanol.

The electrolyte of the fuel cell serves as the electrochemical connection between the electrodes providing a path for ionic current in the circuit while the electrodes, made of carbon or metal, provide an electrical pathway. Further, the electrolyte prevents transfer of the reactants away from the respective electrodes where the formation of explosive mixtures can occur. The electrolyte utilized must not react directly to any appreciable extent with the reactants or reaction products formed during the operation of the fuel cell. Further, the electrolyte must permit the migration of ions formed during operation of the fuel cell. Examples of electrolytes that have been used are aqueous solutions of strong bases, such as alkali metal hydroxides, aqueous solutions of acids, such as sulfuric acid and hydrochloric acid, aqueous salt electrolytes, such as sea water, fused salt electrolytes and ion-exchange polymer membranes.

One type of fuel cell is a polymer electrolyte (PEM) fuel cell which is based on a proton exchange polymer membrane. The PEM fuel cell contains a solid polymer membrane which is an "ion-exchange membrane" that acts as an electrolyte. The ion-exchange membrane is sandwiched between two "gas diffusion" electrodes, an anode and a cathode, each commonly containing a metal catalyst supported by an electrically conductive material. The gas diffusion electrodes are exposed to the respective reactant gases, the reductant gas and the oxidant gas. An electrochemical reaction occurs at each of the two junctions (three phase boundaries) where one of the electrodes, electrolyte polymer membrane and reactant gas interface.

For example, when oxygen is the oxidant gas and hydrogen is the reductant gas, the anode is supplied with hydrogen and the cathode with oxygen. The overall chemical reaction in this process is: $2H_2 + O_2 \rightarrow 2H_2O$. The electrochemical reactions that occur at the metal catalyst sites of the electrodes are as follows:

anode reaction: 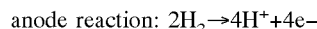
$2H_2 \rightarrow 4H^+ + 4e-$ cathode reaction: 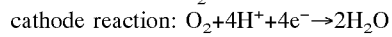
$O_2 + 4H^+ + 4e^- \rightarrow 2H_2O$ During fuel cell operation, hydrogen permeates through the anode and interacts with the metal catalyst, producing electrons and protons. The electrons are conducted via an electronic route through the electrically conductive material and the external circuit to the cathode, while the protons are simultaneously transferred via an ionic route through the polymer electrolyte membrane to the cathode. Concurrently, oxygen permeates to the catalyst sites of the cathode, where the oxygen gains electrons and reacts with the protons to yield water. Consequently, the products of the PEM fuel cell reactions are water and electricity. In the PEM fuel cell, current is conducted simultaneously through ionic and electronic routes. Efficiency of the PEM fuel cell is largely dependent on the ability to minimize both ionic and electronic resistivity to current.

Ion-exchange membranes play a vital role in PEM fuel cells. Improved membranes have substantially increased power density. In PEM fuel cells, the ion-exchange membrane has two functions: (1) it acts as the electrolyte that provides ionic communication between the anode and cathode; and (2) it serves as a separator for the two reactant gases (e.g., $O_2$ and $H_2$).

Optimized proton and water transports of the membrane and proper water management are crucial for efficient fuel cell application. Dehydration of the membrane reduces proton conductivity, and excess water can lead to swelling of the membranes and flooding of the electrodes. Both conditions result in poor cell performance. In the fuel cell, the ion-exchange membrane, while serving as a good proton transfer membrane, also must have low permeability for the reactant gases to avoid crossover phenomena that reduce performance of the fuel cell. This is especially important in fuel cell applications in which the reactant gases are under pressure and the fuel cell is operated at elevated temperatures. Therefore, a good ion-exchange membrane for a PEM fuel cell has to meet the following criteria: (1) chemical and electrochemical stability in the fuel cell operating environment; (2) mechanical strength and stability under cell operating conditions; (3) high proton conductivity, low permeability to reactant gas, and high water transport; and (4) low production costs.

A variety of membranes have been developed over the years for application as solid polymer electrolytes in fuel cells. Sulfonic acids of polydivinylbenzene-styrene based copolymers have been used. Perfluorinated sulfonic acid membranes developed by DuPont and Dow Chemical Company also have been used. DuPont's Nafion® membrane is described in U.S. Pat. Nos. 3,282,875 and 4,330,654.

Nafion® type membranes have high stability and good performance in fuel cell operations. However, they are relatively expensive to produce.

Alternatively, a series of low cost, ion-exchange membranes for PEM fuel cells have been investigated. U.S. Pat. No. 5,422,411 describes trifluorostyrene copolymers that have shown promising performance data as membranes in PEM fuel cells.

Sulfonated poly(aryl ether ketones) developed by Hoechst AG are described in European Patent No. 574,891, A2. These polymers can be crosslinked by primary and secondary amines. When used as membranes and tested in PEM fuel cells, these polymers exhibited only modest cell performance.

A series of low cost, sulfonated polyaromatic based systems, such as those described in U.S. Pat. Nos. 3,528,858 and 3,226,361, also have been investigated as membrane materials for PEM fuel cells. These materials suffer from poor chemical resistance and mechanical properties that limit their use in PEM fuel cell applications.

Polymer blending is a simple, more feasible technology than methods that compound different polymer segments via copolymerization or the formation of interpenetrating materials. Homogeneous polymer blends consist of two polymers that are miscible at the molecular level and combine the properties of the components to yield a distinct new material. However, very rarely does the blending of polymers result in a homogenous polymer blend because in general, polymers do not mix homogeneously, even when they are prepared using the same solvent.

In most cases, Gibbs' free energy of mixing [$\Delta G = \Delta H - T\Delta S$] of polymers is a positive value because the entropy of mixing ($\Delta S$) of high molecular macromolecules approaches zero when the molecular weight of the polymers is greater than 10,000. Unless the enthalpy of mixing ($\Delta H$) is negative or at least equal to zero, polymers are not miscible and attempts to blend the polymers results in phase separation in the "blend" resulting in poor mechanical strength, i.e., a non-homogenous "blend" that retains the distinct phases of the pure polymers and in most cases, poor interaction between the phases occurs. Thus, the non-homogenous "blend" falls apart or has a much weaker structure than the original polymers.

Miscibility of polymers occurs in their amorphous regions. If one polymer in a two polymer blend is a semi-crystalline material, the crystal structure of the polymer retains its purity in the blend. However, its melting point usually decreases when the two polymers in the blend are miscible. Therefore, if two polymers are miscible, and one of the polymers is semi-crystalline, a semi-crystalline polymer blend is formed in which the amorphous structure is miscible. The different amorphous phases of the two polymers do not separate, but the crystalline component spreads within the amorphous structure and serves as "crosslink" junctures.

The crosslinking term when applied to crystalline junctures does not refer to chemical crosslinking as in chemical or radiation treatment. Rather in this context, it refers to what occurs because the crystals are composed of macromolecules that extend into the amorphous structure and, thus interact and blend with the polymer chains of the non-crystalline polymers. Therefore, the crystalline structure is tied up to the amorphous structure in polymer blending by polymer molecules that partially take part in the building of the crystal and are partially amorphous. These polymer molecules take part in the amorphous form and interact with other miscible polymers. For example, it is expected that a polymer blend, semi-crystalline film will exhibit a much higher tensile strength than the theoretical arrhythmic weight average of the pure polymer component. Also, it is expected that miscible polymers in a blend will display homogeneity with regard to some desired properties such as optical clarity, glass transition temperatures and for membrane purposes, improved mass transport properties.

Considerable research has been done in attempts to prepare blend polymer membranes. However, only a few membrane systems have been discovered. Y. Maeda et al., Polymer, 26, 2055 (1985) report the preparation of blend membranes of poly(dimethylphenylene oxide)-polystyrene for gas permeation. They found this system to exhibit permeation rates unlike the permeation rates of either of the blend's polymer components.

Poly(vinylidene fluoride), $PVF_2$, is a hydrophobic polymer that is used as a membrane in microfiltration and ultrafiltration. Bernstein et al., Macromolecules, 10, 681 (1977) report that a blend of $PVF_2$ with poly(vinyl acetate) increases hydrophilicity of such hydrophobic membrane, which is needed in order to ultrafiltrate aqueous solutions. They found the macromolecules of the two polymers to be miscible at the molecular level. However, very few scientific tools are provided to predict a blend polymer membrane suitable for use in electrochemical cells.

It is, therefore, an objective of the invention to produce a low cost, easy to prepare ion-exchange polymer membrane with favorable chemical and mechanical properties for PEM fuel cell and other electrochemical applications.

Another object of the invention is to provide an improved solid polymer electrolyte fuel cell having a high current density, e.g., between 1 A/cm$^2$ and 2 A/cm$^2$ at 0.5 V, using a very low loading electrode equivalent to a platinum loading of between 0.1 and 0.2 mg/cm$^2$ on a platinum/carbon/PTFE electrode at 30 psi reactant gases.

Another object is to provide novel homogeneous blends of sulfonated poly(phenylene oxide) with poly(vinylidene fluoride).

It also is an object of this invention to provide a process for preparing the novel blends and for preparing PEM fuel cells utilizing the novel blends as ion-exchange membranes.

SUMMARY OF THE INVENTION

The objectives and criteria for the solid electrolyte membrane mentioned above can be achieved by the practice of this invention. In one aspect, this invention concerns an improved polymer electrolyte membrane, the improvement in which the membrane comprises a sulfonated poly(phenylene oxide) or a sulfonated poly(phenylene oxide) blended with poly(vinylidene fluoride), the sulfonated poly(phenylene oxide) having a number average molecular weight between about 15,000 and 10,000,000 and an ion charge density between about 1 and 3.9 meq/g, the poly(vinylidene fluoride) having a number average molecular weight between about 10,000 and 10,000,000, the weight ratio of sulfonated poly(phenylene oxide) to poly(vinylidene fluoride) in the blend being between about 1 to 1 and about 20 to 1.

In another aspect, this invention concerns an improved solid polymer electrolyte fuel cell containing a ion-exchange polymer membrane as electrolyte sandwiched between an electrochemically reactive porous anode and cathode, the improvement in which the ion-exchange polymer membrane comprises a sulfonated poly(phenylene oxide) or a sulfonated poly(phenylene oxide) blended with poly(vinylidene fluoride), the sulfonated poly(phenylene oxide) having a number average molecular weight between 15,000 and 10,000,000 and an ion charge density between 1 and 3.9 meq/g, the poly(vinylidene fluoride) having a number average molecular weight between about 10,000 and about 10,000,000, the weight ratio of sulfonated poly(phenylene oxide) to poly(vinylidene fluoride) in the blend being between about 1 to 1 and 20 to 1, the fuel cell having a current density between about 1 A/cm$^2$ and about 2 A/cm$^2$ at 0.5 V, using an electrode having the equivalent of a platinum catalyst loading between 0.1 and 0.2 mg/cm$^2$ on a platinum/carbon/PTFE electrode at 30 psi reactant gases.

In yet another aspect, this invention relates to a blend ion-exchange membrane for electrochemical cells comprised of a blend of sulfonated ion exchange poly(phenylene oxide) and poly(vinylidene fluoride), the sulfonated poly(phenylene oxide) having a number average molecular weight between 15,000 and 10,000,000 and an ion charge density between 1 and 3.9 meq/g, the weight ratio of sulfonated poly(phenylene oxide) to poly(vinylidene fluoride) in the blend being between about 1 to 1 and 20 to 1, the blend being prepared by the following process steps:
   a. separately dissolving sulfonated poly(phenylene oxide) and poly(vinyl fluoride) in respective solvents;
   b. mixing the polymer solutions together in a weight ratio of sulfonated poly(phenylene oxide) to poly(vinyl fluoride) between about 1 to 1 and about 20 to 1 to form a blend solution;
   c. casting the blend solution onto a clean surface; and
   d. drying the cast blend solution for a time sufficient to evaporate the solvent(s) and form a dry blend membrane having a thickness between about 10 micrometers and about 200 micrometers.

DETAILED DESCRIPTION OF THE INVENTION

Figure 1:
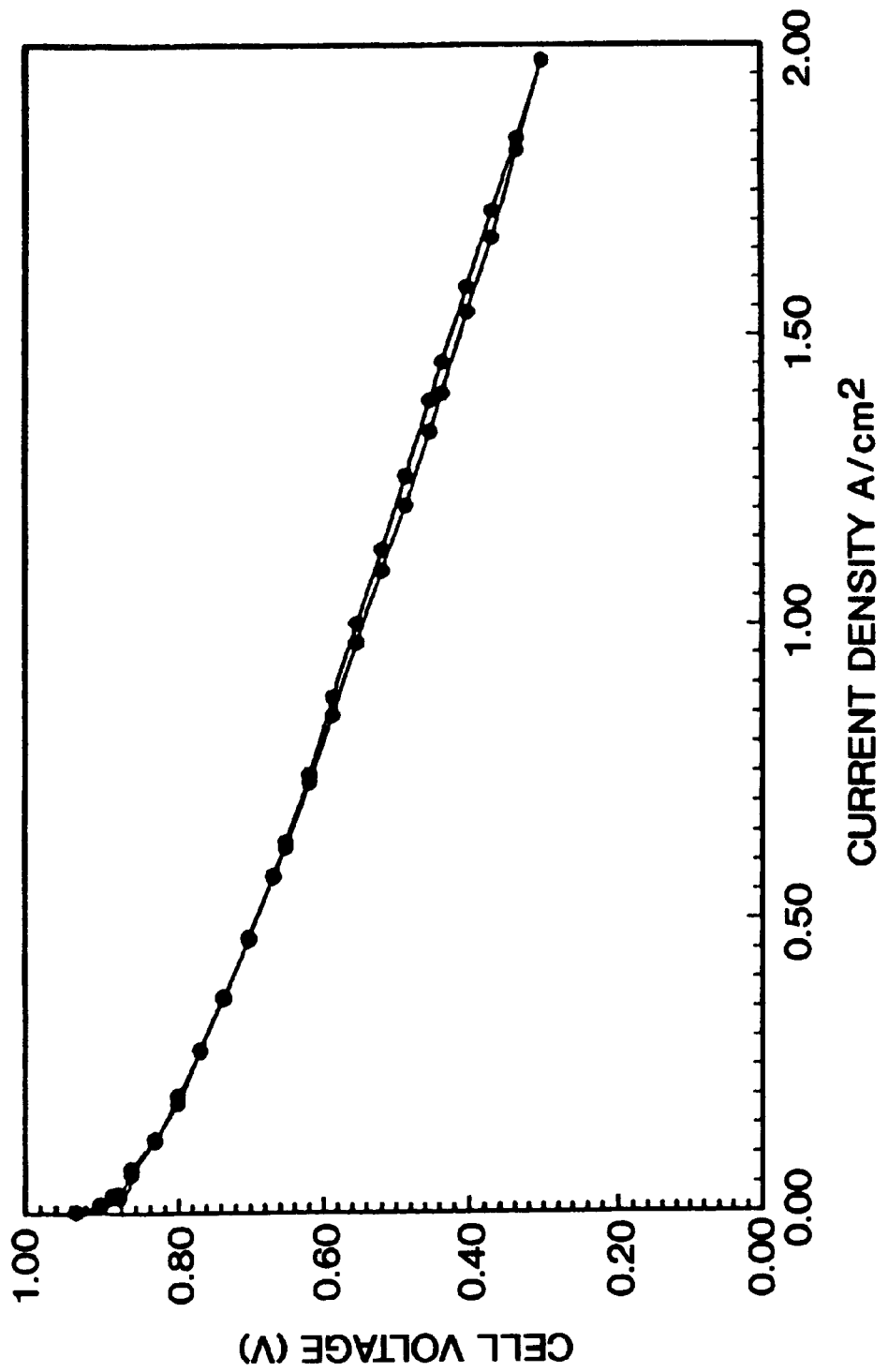
FIG. 1 is a graph of fuel cell potential (cell voltage (V)) vs. current density (A/cm$^2$) for a fuel cell assembly according to this invention having a blend membrane in a ratio of 85 wt % sulfonated PPO and 15 wt % PVF$_2$ and a platinum (Pt)-carbon (C)/polytetraflouroethylene (PTFE) electrode (Pt loading is 0.17 mg/cm$^2$) at 45° C., 30 psig, and a cell area of 5 cm$^2$.

The sulfonated poly(phenylene oxide) polymer used in this invention has a chemical structure characterized by the following recurring unit:

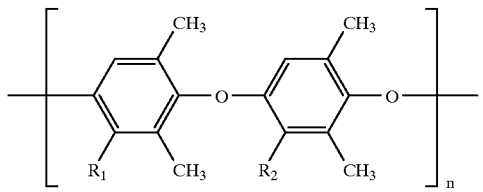

where $R_1$ and $R_2$ are each selected from the group of substituents consisting of H, SO$_3$H and SO$_3$M, wherein n is an integer greater than 40, and M is selected from the group consisting of an alkaline metal, an alkaline earth metal, and a transition metal. When the substituents are more frequently SO$_3$H and SO$_3$M than H, the polymer has a higher charge density and is more soluble in water. Conversely, when H is more frequently the substituent, the polymer has lower charge densities.

Suitable alkaline metals include sodium, lithium and potassium; suitable alkaline earth metals include calcium, barium, magnesium and aluminum; and suitable transition metals include chromium and iron. Preferably, $R_1$ and $R_2$ each include the lithium salt of sulfonic acid and sulfonic acid groups in the recurring unit. Sulfonated poly(phenylene oxide) polymers suitable for use in applicants' invention are described in U.S. Pat. Nos. 5,348,569 and 5,364,454, the disclosures of which are herein incorporated by reference.

It is critical to prepare the sulfonated poly(phenylene oxides by a homogeneous process. One homogeneous process involves dissolving precursor aromatic polymers in an inert solvent; adding and mixing a sulfonation agent at a temperature sufficiently low to avoid any significant sulfonation reaction, and raising the temperature of the resulting mixture to cause sulfonation of the precursor aromatic polymer.

The homogeneously sulfonated poly(phenylene oxide) polymer in salt form is very soluble in common solvents, such as alcohols, ketones, aprotic solvents and mixtures of these solvents with water. The degree of sulfonation is measured by the ionic charge density, ICD, and expressed in meq/g (which is the milliequivalent of $SO_3^-$/gram of polymer).

Applicants have discovered that when certain sulfonated poly(phenylene oxide) polymers as described herein having (1) molecular weights greater than about 15,000, preferably greater than about 30,000, more preferably greater than about 50,000, and less than about 10,000,000, preferably less than about 1,000,000 and (2) an ion charge density greater than about 1.0 meq/g, preferably greater than about 1.7 meq/g, more preferably greater than about 2.0 meq/g, and less than about 3.9 meq/g, preferably less than about 3.5 meq/g, are used alone or blended with certain poly (vinylidene fluoride)polymers, electrolyte membranes having improved characteristics may be formed. Most preferred is a sulfonated poly(phenylene oxide) having an ionic charge density of about 3.0 meq/g. Specifically, the resultant membranes have enhanced selectivity, permeability, and mechanical strength, and are easily crosslinked by γ-ray radiation, ultra violet (UV) radiation and thermal treatment. Moreover, applicants' sulfonated poly(phenylene oxide) polymers can be copolymerized with other polymers.

Applicants also have discovered that a sulfonated poly (polyphenylene oxide) as defined herein forms a homogeneous blend with poly(vinylidene fluoride) which may advantageously be used as a polymer membrane electrolyte. Sulfonated PPO is an amorphous cation exchange polymer, while $PVF_2$ is a hydrophobic thermoplastic polymer. $PVF_2$ is a semi-crystalline polymer that displays up to 50% semi-crystallinity. It is soluble in solvents like dimethylsulfoxide (DMSO), N-methyl pyrrolidone (NMP), dimethylacetamide, and dimethylformamide (DMF). Its crystal melting point is between 155° C. and 163° C. and its glass transition temperature is between −30° C. and −10° C. Therefore, $PVF_2$ is a non-crosslinked, rubbery polymer where the hard crystalline domains serve as crosslinking junctures in the blend.

Applicants have surprisingly found that blends of $PVF_2$ with sulfonated PPO polymer, as defined herein, exhibit distinct melting points of the crystalline domain of $PVF_2$ between 155° C. and 158° C., and have a much higher modulus and tensile strength than sulfonated poly (phenylene oxide) has. Moreover, applicants have discovered that some compositions of such blends have unexpectedly higher ionic conductivity than sulfonated PPO has. This is surprising since one would have expected that blending poly(vinylidene fluoride) with sulfonated PPO would decrease ionic conductivity. Higher ionic conductivity using a blend membrane according to applicants' invention means the fuel cells have better performance than a fuel cell using a sulfonated PPO membrane.

Applicants further have found there is reduced swelling in blend membranes according to applicants' invention. It is believed that the $PVF_2$ in the blend reduces the absorption of water in the blend membrane when submerged in water. The percent water absorbed (W) is less than about 25%.

Applicants' blends are made by dissolving sulfonated poly(phenylene oxide) in a solution with solvent, dissolving poly(vinylidene fluoride) in a solution with solvent and mixing the solutions together. The blend membrane then is obtained by casting this mixed solution onto a clean glass surface with a Doctor knife and drying the solution for a time period sufficient to evaporate essentially all of the solvent, leaving a dry, translucent white film having a thickness greater than about 10 micrometers ($\mu$m), preferably greater than about 40 $\mu$m, less than about 200 $\mu$m and preferably less than about 150 $\mu$m.

The weight ratio of sulfonated-poly(phenylene oxide) to the $PVF_2$ in the blend according to this invention is about 1 to 1 and above, preferably greater than about 3 to 1, and more preferably about 4 to 1 and above. Also, the weight ratio of sulfonated-poly(phenylene oxide) to the $PVF_2$ in the blend is less than about 20 to 1, preferably less than about 9 to 1, and more preferably less than about 6 to 1. The sulfonated PPO preferably comprises from 50% to 90% by weight of the blend and $PVF_2$ comprises from 50% to 10% of the blend. Most preferred are blends where the sulfonated PPO comprises between about 80 wt % and about 85 wt % of the blend, the balance being the $PVF_2$. If desired, the mechanical strength of blend membranes of this invention can be further increased by γ-ray radiation, UV radiation and/or by thermal treatment.

Unlike conventional membranes like Nafion® which must be pressed onto electrodes at elevated temperatures of 120° C. to 150° C. and pressures of 200 psi to 1,000 psi, the sulfonated PPO membrane and the blend membranes of this invention bond easily to electrodes at room temperature without requiring the application of pressure. A good interface is formed between electrodes and the sulfonated PPO membrane or blend membranes of this invention in the membrane electrode assembly. Electrodes are treated in the usual way with a solution of proton exchange polymer that can be selected from Nafion® solution dissolved in alcohol and the sulfonated PPO, or other soluble high charge density cation exchange polymers. The performance of the PEM fuel cells made by this invention were compared with the performance of perfluorinated Nafion® membranes in the same experimental set up and conditions and were found to be equal or better. The higher densities obtained with applicants' fuel cell were measured under one set of conditions. Of course, it is obvious to a skilled person that even higher current densities can be obtained with applicants' fuel cell under different conditions. For example, higher current densities can be obtained by using thinner membranes, higher reactant gas pressures and/or higher temperatures of operation.

The homogeneous blend membrane of sulfonated poly (phenylene oxide) with thermoplastic polymer $PVF_2$ of the present invention has the following advantages: (1) Easy to produce a large series of membranes with different ratios of sulfonated poly(phenylene oxide) and $PVF_2$; (2) Possible to introduce different copolymers of $PVF_2$ into blends with sulfonated poly (phenylene oxide); (3) some sulfonated PPO/$PVF_2$ blend membranes have higher conductivity than pure sulfonated poly(phenylene oxide) membranes; (4) Blend membranes have higher flexibility and mechanical strength than pure sulfonated PPO membranes; (5) Blend membranes have lower swelling ratios in than pure sulfonated PPO. Therefore, these membranes can be used as follows:

(1) As a polymer electrolyte membrane for hydrogen/oxygen electrochemical fuel cells.

(2) Electrode separation in secondary batteries.

(3) As ion-exchange membranes in electrodialysis, in which membranes are employed to separate components of an ionic solution under the driving force of an electrical current.

(4) Membranes in gas separation and pervaporation due to the enhanced selectivity and permeability of homogeneously sulfonated poly(phenylene oxide).

The following examples illustrate applicant's invention, but should not be construed as limiting the invention:

EXAMPLE 1

A light yellow sulfonated PPO polymer in the Li$^+$form ($M_W$=50,000) was immersed in 1N HCl solution for several hours at room temperature. This step exchanges Li$^+$with H$^+$in the SO$_3$-group. The polymer was then washed carefully in D. I. water to rinse the excess acid. The wet sulfonated PPO in the H$^+$form was put in a vacuum oven for 24 h at 40° C. The sulfonated PPO was then dissolved in dimethylformamide (DMF) to form a 20 wt % solution. A 20 wt % solution of poly(vinylidene fluoride), PVF$_2$ ($M_W$=60,000), in DMF was prepared separately. Then, 2.55 g of sulfonated PPO-DMF solution and 0.45 g of PVF$_2$- DMF solution were blended by mixing the two solutions at room temperature for 1 h. This blend has a 85:15 weight ratio of sulfonated-PPO:PVF$_2$. This blend solution was poured onto a clean glass plate surface and cast by a Doctor knife. This was then placed in a chamber under dry air flow for 48 h to evaporate most of the DMF. The final membrane was a dry, translucent, white with a 50 μm thickness. The ICD of this membrane was 2.9 meq/g.

This dry membrane was put into water for 0.5 h and then placed between two Pt (Pt loading was 0.17 mg/cm$^2$)/ carbon-PTFE fuel cell electrodes without application of pressing or elevated pressure and at room temperature. Before insertion of the membrane, the electrodes were treated with proton exchange interface materials. The conductivity of the wet membrane at 45° C. was 0.019 S/cm. The PEM fuel cell (5 cm$^2$) was tested at 45° C., at 30 psig with O$_2$/H$_2$ as the reactant gases. FIG. 1 shows the polarization curve of this blend membrane fuel cell. It had an open cell voltage of 0.95 V and at 0.3 V, the fuel cell displayed 2 A/cm$^2$ current density. Mass transfer limitations of flooding or drying were not observed at this current.

EXAMPLE 2

20 wt % sulfonated-PPO Li$^+$form polymer ($M_W$=50,000) was dissolved in DMF and 20 wt % of PVF$_2$ ($M_W$=60,000) was dissolved in DMF, separately. Then, the two solutions were mixed in a weight ratio of sulfonated-PPO to PVF$_2$ of 80:20. This blended solution was stirred at room temperature for 1 h. The blend solution was poured onto a clean surface glass plate, and cast by a Doctor knife. The cast solution then was placed in a chamber under dry air for 48 h. After the membrane had dried, it then was placed into 0.5 N HCl solution for exchange of Li$^+$to be converted to proton form. The cast membrane was 55 μm thick and in the wet state, has a conductivity of 0.22 S/cm at 45° C.

Figure 2:
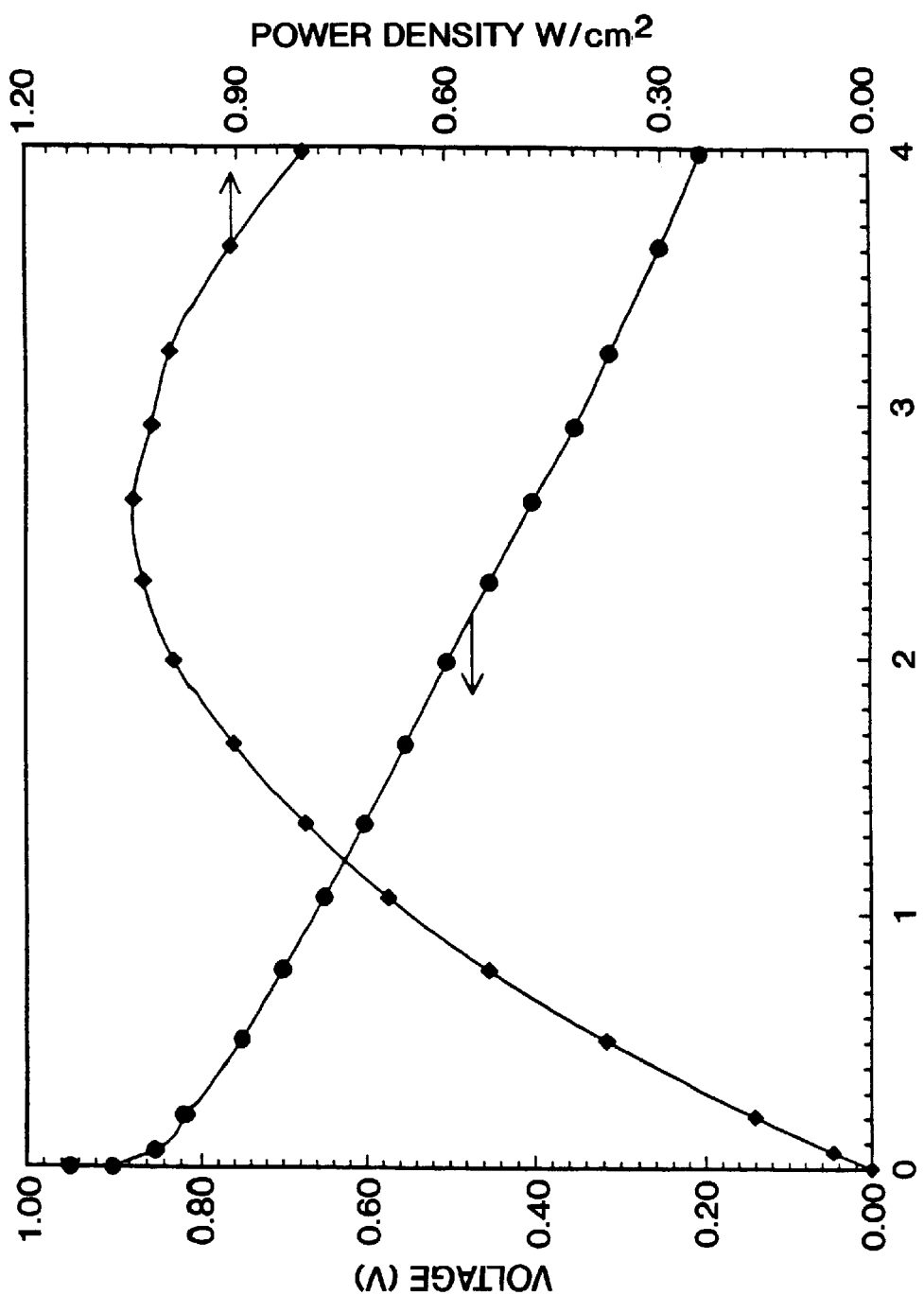
FIG. 2 is a graph of fuel cell potential (cell voltage (V)) and power density (W/cm$^2$) vs. current density (A/cm$^2$) for a fuel cell assembly according to this invention having a blend membrane in a ratio of 80 wt % sulfonated PPO and 20 wt % PVF$_2$ and a Pt-C/PTFE electrode (Pt loading is 0.17 mg/cm$^2$) at 70° C., 30 psig.
Figure 3:
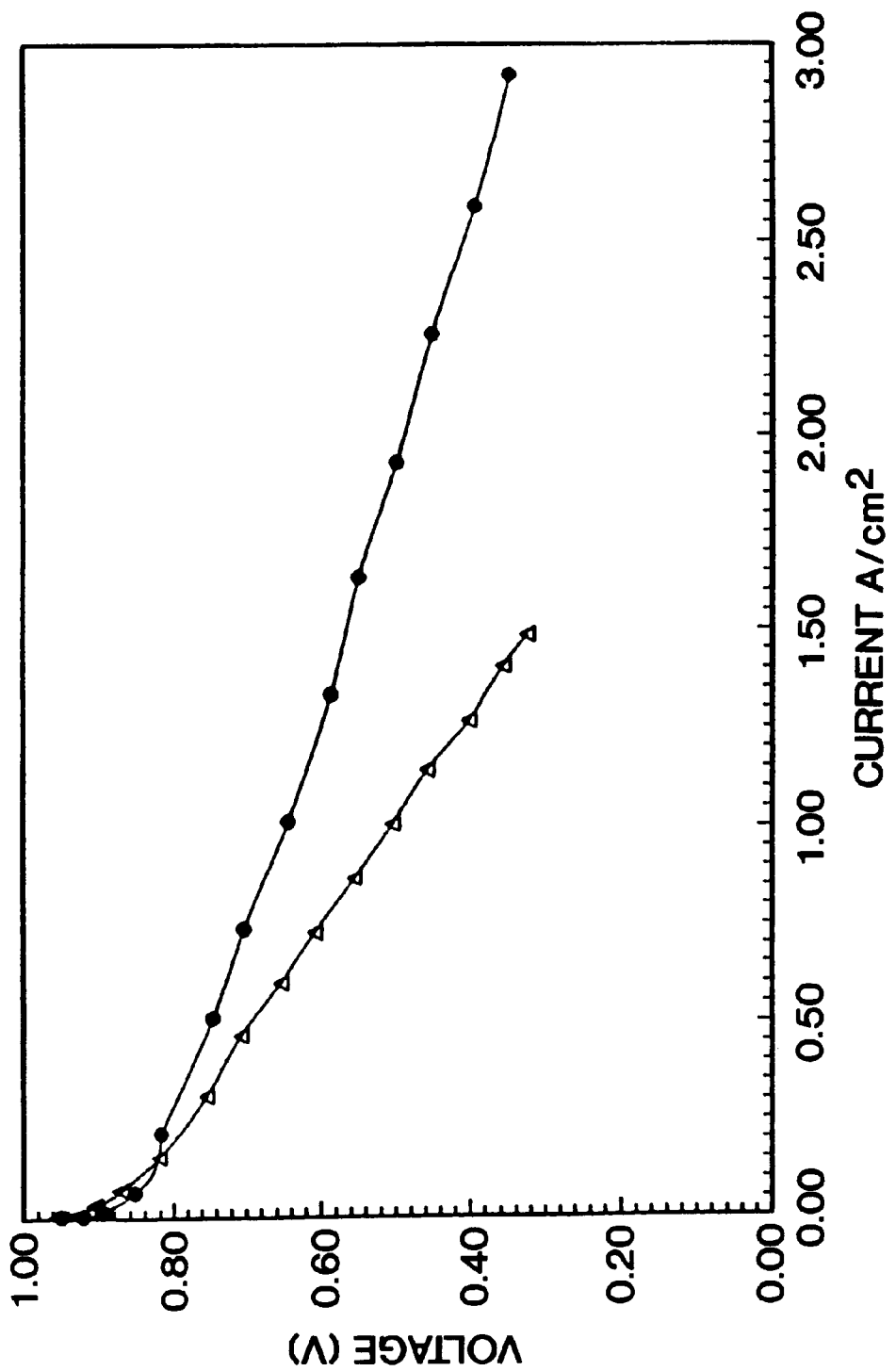
FIG. 3 is a graph of fuel cell potential (cell voltage (V)) vs. Current density (A/cm$^2$) for two fuel cell assembles, one (●) made according to this invention having a blend membrane in a ratio of 80 wt % sulfonated PPO to 20 wt % PVF$_2$ (Mw=60,000), and the other (Δ) having a Nafion 112 membrane with Pt/CPTFE electrode (Pt loading=0.17 mg/cm$^2$) using H$_2$/O$_2$ gas reactant at 45° C., 30 psig. Both membranes had a thickness of 50 micrometers.

This polymer electrolyte blend membrane then was placed between two electrodes at ambient temperature and in the absence of any elevated pressure. FIG. 2 shows the polarization curve of this PEM fuel cell. The maximum current density achieved was 4 A/cm$^2$ at 70° C., 30 psig of O$_2$/H$_2$ reactant gas. The maximum power density under these conditions was 1.08 W/cm$_2$. FIG. 3 gives comparison I-V curves of a fuel cell made using a Nafion 112 membrane and a fuel cell made using the blend membrane prepared according to this example.

EXAMPLE 3

Figure 4:
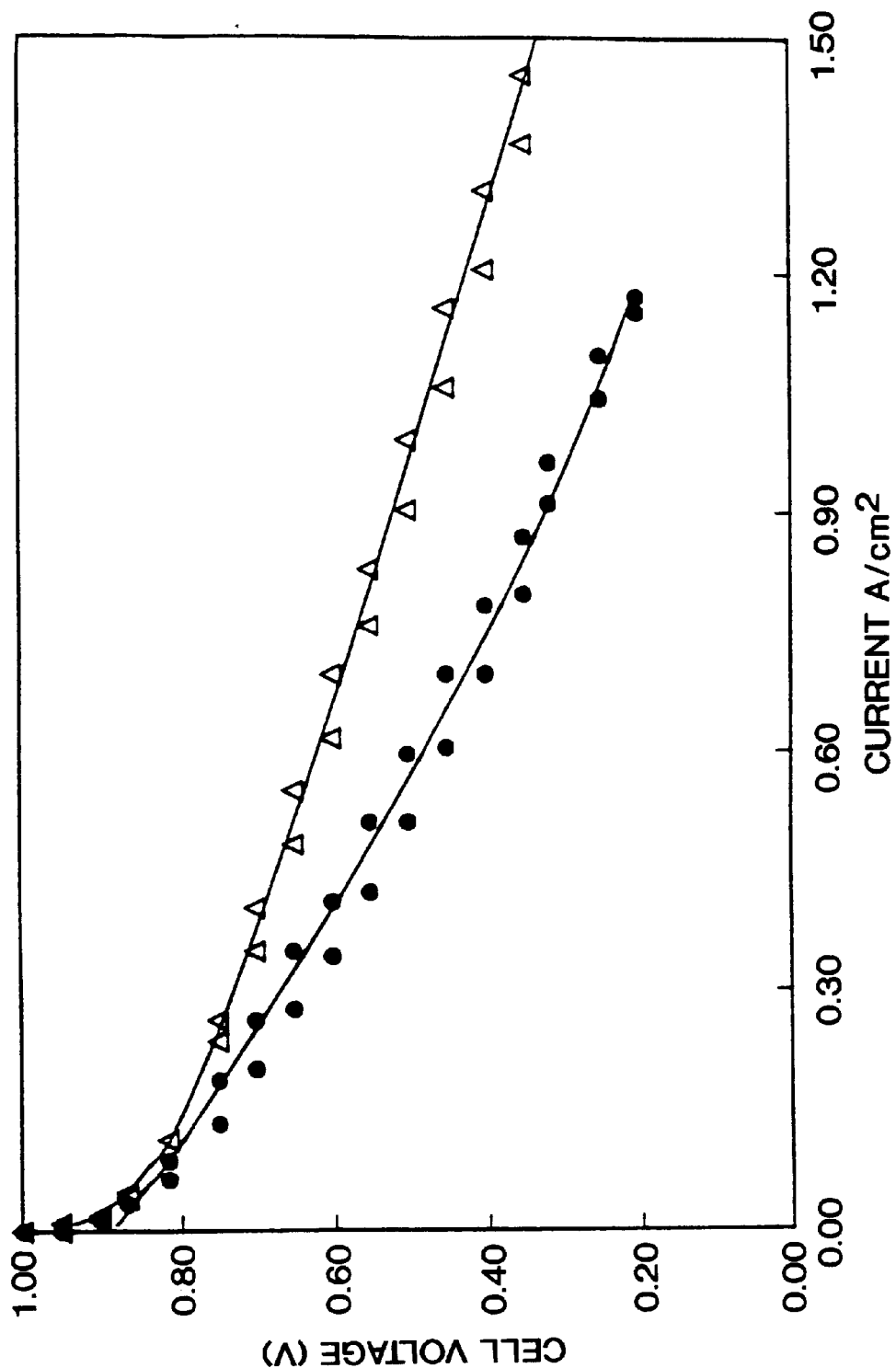
FIG. 4 is a graph of fuel cell potential (cell voltage (V)) vs. current density (A/cm$^2$) for two fuel cell assemblies according to this invention having a sulfonated PPO membrane with ICD=2.97 meq/g and using a Pt-C/(PTFE) electrode (pt loading is 0.17 mg/cm$^2$) at 45° C. and 30 psig, one (Δ) using H$_2$/O$_2$ gas reactants; and the other (●) using H$_2$/air gas reactants.

25 wt % of sulfonated PPO Li$^+$form polymer ($M_W$=50,000) was dissolved in isopropanol. No second polymer was added. The sulfonated PPO membrane was cast by a Doctor knife on a clean surface glass plate. The membrane was dried in dry air atmosphere for 48 h and then put in an oven at 70° C. for 24 h. The sulfonated membrane was transparent with a light yellow-brown color. The thickness of the membrane was 120 μm. The membrane then was placed in 0.1 N HCl solution for 1 h. The ICD of this membrane was measured as 3.0 meq/g. The swelling ratio of this membrane in water was 25% at 30° C. and 31% at 80° C. Conductivity of the membrane at 45° C. was 0.016 S/cm. A PEM fuel cell was made according to the same process as Example 1. FIG. 4 shows the I-V curve of this fuel cell in H$_2$/O$_2$ and H$_2$/air reactants. The fuel cell was run 300 h at 1 A/cm$^2$ without decreased performance (platinum loading on Pt/C (PTFE) electrode was 0.17 mg/cm$^2$). It had an open cell voltage of 1.04 V.

EXAMPLE 4

The same procedure was employed as in Example 3, except that the membrane was crosslinked by γ-ray radiation. The I-V polarization exhibited by the PEM fuel cell was 0.9 A/cm$^2$ at 0.5V.

EXAMPLE 5

The same procedure was employed as in Example 3, except that the solvent used was DMF. The I-V polarization exhibited by this fuel cell was 1 A/cm$^2$ at 0.5V at 45° C.

EXAMPLE 6

The same procedure was employed as in Example 3, except that the membrane was subjected to crosslinking by heat treatment at 80° C. for 5 minutes. The PEM fuel cell exhibited an I-V polarization of 0.60 A/cm$^2$ at 0.5 V.

EXAMPLE 7

The same procedure was employed as in Example 3, except that the membrane was exposed to UV radiation for 30 minutes. The PEM fuel cell exhibited an I-V polarization of 1.1 A/cm$^2$ at 0.5 V.

EXAMPLE 8

The same procedure was employed as in Example 1, except that the weight ratio of sulfonated PPO to PVF$_2$ was 75:25. Table 1 below sets forth the conductivity (S/cm), % water absorption (W$^2$), open cell voltage (V), current density (I) at 0.5 V (A/cm$^2$ and test time (h) measured for this fuel cell.

TABLE 1

Properties and Performance of Sulfonated
PPO-PVF$_2$ (Lower Molecular Weight)
Blend Membranes and Their Fuel Cells

| Wt. Ratio of Sulfonated PPO to PVF$_2$ in Blend Membrane[a] | Conductivity (ρ) in Siemens/cm (S/cm) | % of H$_2$O Absorbed in Membrane (W = [(Wwet – Wdry) × 100 at 30° C.] | Open Cell Voltage in Volts (V) | Current Density (I$_{0.5v}$) in Amps/cm$^2$ (A/cm$^2$) | Test Time in hours (h) |
|---|---|---|---|---|---|
| 100 S-0 FL | 0.016 | 25 | 1.04 | 0.95 | 300 |
| 85 S-15 FL | 0.019 | 22 | 0.95 | 1.2 | 200 |
| 80 S-20 FL | 0.021 | 18 | 0.95 | 2.0 | 200 |
| 75 S-25 FL | 0.015 | 16 | 0.96 | 0.8 | 100 |
| 70 S-30 FL | 0.011 | 5 | 0.96 | 0.8 | 100 |
| 65 S-35 FL | 0.010 | <2 | ~0.95 | 0.75 | 25 |
| 50 S-50 FL | 0.013 | <2 | ~0.95 | 0.70 | 25 |

[1]S = Sulfonated PPO, FL = PVF$_2$ (MW = 60,000)

EXAMPLE 9

The same procedures were used as in Example 1, except that the weight ratio of sulfonated PPO to PVF$_2$ was 70:30. Table 1 above sets forth conductivity, % water absorbed, open cell voltage, current density at 0.5V and the test time for this fuel cell.

EXAMPLE 10

The same procedures were used as in Example 1, except that the weight ratio of sulfonated PPO to PVF$_2$ was 65:35. Table 1 above sets forth conductivity, % water absorbed, open cell voltage, current density at 0.5V and the test time measured for this fuel cell.

EXAMPLE 11

The same procedures were used in Example 1, except that the weight ratio of sulfonated PPO to PVF$_2$ was 50:50. Table 1 summarizes properties and performance of these membranes (Examples 1–11).

EXAMPLE 12

Figure 5:
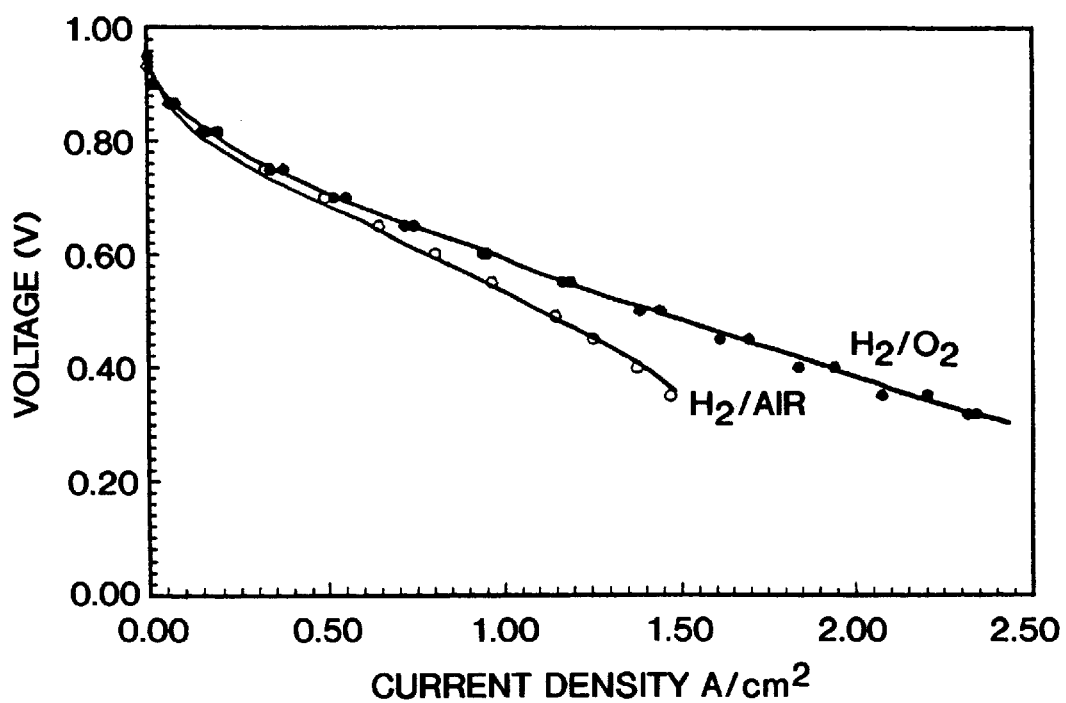
FIG. 5 is a graph of fuel cell potential (cell voltage (V)) vs. current density (A/cm$^2$) for a fuel cell assembly according to this invention having a blend membrane in a ratio of 80 wt % sulfonated PPO and 20 wt % PVF$_2$ (molecular weight Mw=350,000) and a Pt-C/PTFE electrode (Pt loading is 0.17 mg/cm$^2$) at 45° C., 30 psig (O) using H$_2$/O$_2$ gas reactants; (●) using H$_2$/air gas reactants.
Figure 6A:
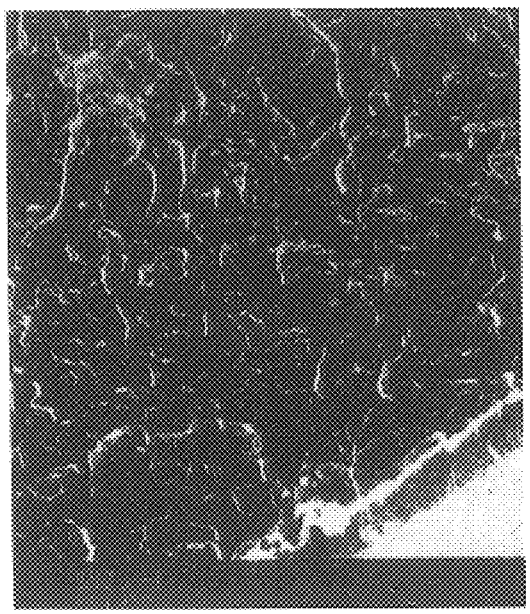
FIG. 6 is a scanning electron microscope (SEM) photograph magnified 2000X of a cross-section of a blend membrane according to the present invention and a SEM photograph magnified 1000X of a surface of the blend membrane according to the present invention. The blend membrane comprises 80 wt % sulfonated PPO and 20 wt % PVF$_2$ (Mw=350,000).
Figure 6B:

A sulfonated PPO polymer in Li$^+$form (Mw=50,000) was dissolved in dimethylformamide (DMF) to form a 20 wt % solution. A 20 wt % solution of high molecular weight PVF$_2$ (Mw=350,000), in DMF was prepared separately. Then 8g of sulfonated PPO-DMF solution and 2 g of PVF$_2$-DMF solution were blended by mixing the solutions at room temperature for 0.5 h. This blend had an 80:20 weight ratio of sulfonated-PPO:high molecular weight PVF$_2$. The blend solution was poured onto a clean surface glass plate, and cast by a Doctor knife. Then the blend membrane was placed in a chamber under dry air for 48 h. The blend membrane was placed into a 0.5 N HCl solution for exchange of Li$^+$and conversion to proton form, before assembly in a fuel cell. A PEM fuel cell was made according to the same process as Example 1. FIG. 5 shows the polarization curves of the PEM fuel cell made using this membrane at 60° C. and 30 psig pressure of reactant gases. FIG. 6 shows SEM photographs of this membrane. This membrane can absorb 9.9 water molecular per charge at 80° C.

EXAMPLE 13

Figure 7:
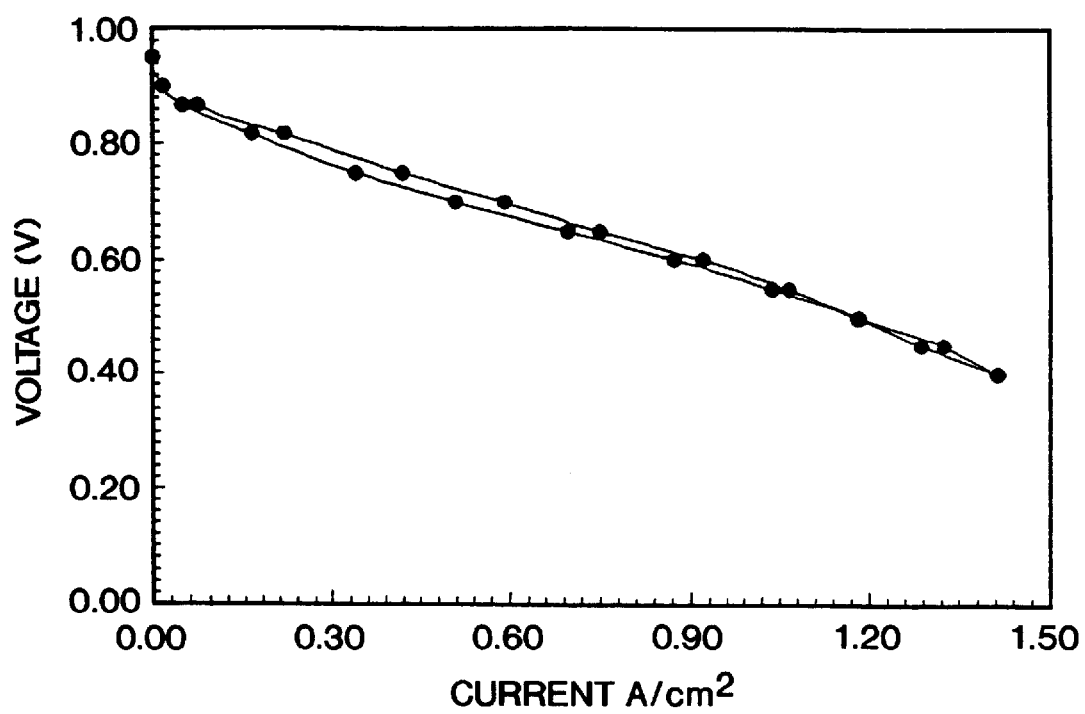
FIG. 7 is a graph of fuel cell potential (cell voltage v. Current density) for a fuel cell assembly according to this invention having a blend membrane in a ratio of 70 wt % of sulfonated PPO to 30 wt % PVF$_2$ (Mw=350,000) and a Pt-C/PTFE electrode (Pt loading=0.2 mg/cm$_2$) at 80° C., 30 psig using H$_2$/air gas reactants.
Figure 8A:
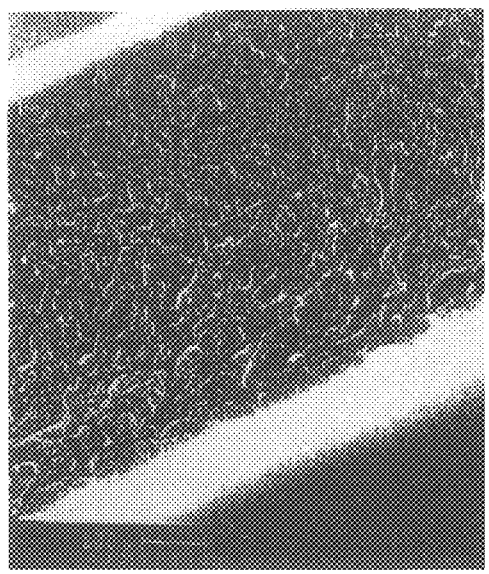
FIG. 8 is a scanning electron microscope (SEM) photograph magnified 200X of a cross-section of a blend membrane according to the present invention and a SEM photograph magnified 200X of a surface of the blend membrane according to the present invention. The blend membrane comprises 70 wt % sulfonated PPO and 30 wt % PVF$_2$ (Mw=350,000).
Figure 8B:
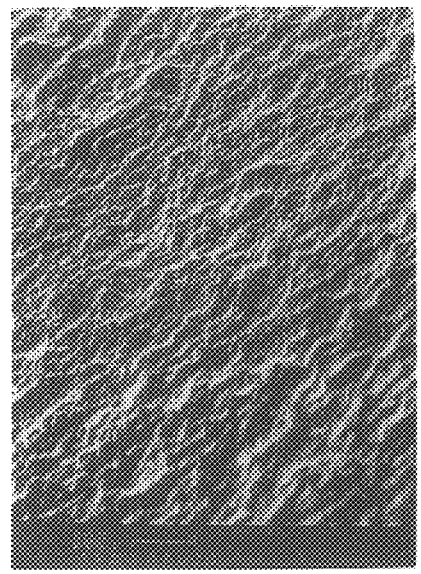

The same procedure was used as in Example 12, except the weight ratio of sulfonated PPO to High molecular weight PVF$_2$ was 70:30. The fuel cell assembly using this membrane has a good performance under higher operated temperature (80° C.). FIG. 7 shows the polarization curve of the PEM fuel cell made using this membrane at 80° C. and 30 psig pressure using H$_2$/as reactant gas. FIG. 8 shows SEM photographs of this membrane. The conductivity of this membrane is 0.208 S/cm at 80° C. and its water uptake is 7.4 nH$_2$O/charge. This PEM fuel cell tested at 80° C. for 300 hours without a decrease in performance.

EXAMPLE 14

Figure 9A:
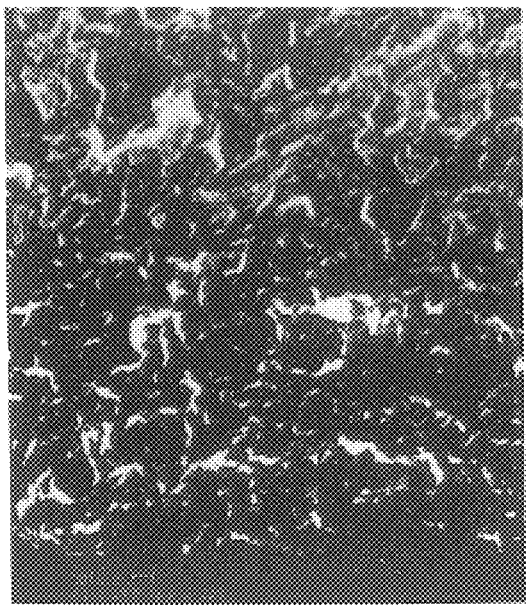
FIG. 9 is a scanning electron microscope (SEM) photograph magnified 3000X of a cross-section of a blend membrane according to the present invention and a SEM photograph magnified 1000X of a surface of the blend membrane according to the present invention. The blend membrane comprises 50 wt % sulfonated PPO and 50 wt % PVF$_2$ (Mw=350,000).
Figure 9B:
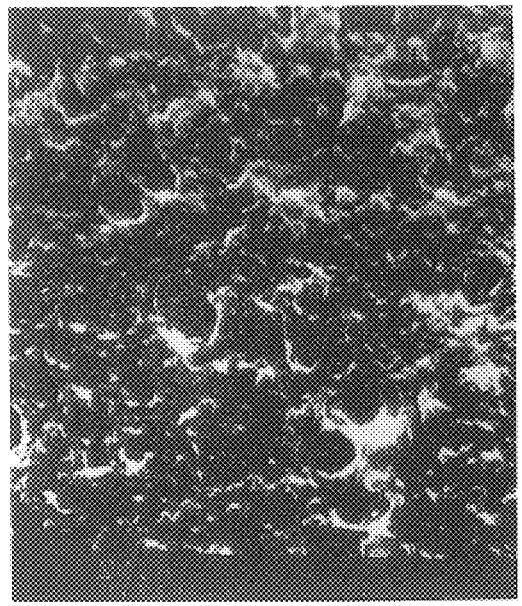

The same procedure was used as in Example 12, except the weight ratio of sulfonated PPO to PVF$_2$ (Mw=350,000) was 50:50. The fuel cell assembly by this membrane tested at 80° C. for 300 hours without decreasing performance. FIG. 9 shows the SEM photographs of this membrane. Table 2 below summarizes properties of blend membrane (Examples 12–14) and performance of their PEM fuel cells.

TABLE 2

Properties and Performance of Sulfonated
PPO-PVF$_2$ (Higher Molecular Weight)
Blend Membranes and Their Fuel Cells

| Wt. Ratio of Sulfonated PPO to PVF$_2$ in Blend Membranes[b] | Conductivity (ρ) in Siemens/cm (S/cm) at 80° C. | Water Content at 80° C. (number of water molecular per charge) in Blend Membrane nH$_2$O/SO$_3$H | Open Cell Voltage in Volts (V) | Current Density (I$_{0.5v}$) in Amps/cm$^2$ (A/cm$^2$) | Test Time in hours (h) |
|---|---|---|---|---|---|
| 100 S-0 FH | 0.14 | 18.5 | 1.04 | 1.5 (60° C.) | 300 (60° C.) |
| 80 S-20 FH | 0.274 | 9.9 | 0.95 | 1.8 (60° C.) | 200 (60° C.) |

TABLE 2-continued

Properties and Performance of Sulfonated
PPO-PVF$_2$ (Higher Molecular Weight)
Blend Membranes and Their Fuel Cells

| Wt. Ratio of Sulfonated PPO to PVF$_2$ in Blend Membranes[b] | Conductivity ($\rho$) in Siemens/cm (S/cm) at 80° C. | Water Content at 80° C. (number of water molecular per charge) in Blend Membrane nH$_2$O/SO$_3$H | Open Cell Voltage in Volts (V) | Current Density ($I_{0.5v}$) in Amps/cm$^2$ (A/cm$^2$) | Test Time in hours (h) |
|---|---|---|---|---|---|
| 70 S-30 FH | 0.208 | 7.4 | 0.95 | 1.4 (80° C.) | 300 (80° C.) |
| 60 S-40 FH | 0.17 | 5.7 | 0.95 | 1.1 (80° C.) | 100 (80° C.) |
| 50 S-50 FH | 0.14 | 4.1 | 0.95 | 0.9 (80° C.) | 300 (80° C.) |
| 40 S-60 FH | 0.027 | 2.9 | 0.85 | 0.4 (80° C.) | 50 (80° C.) |

[b]S = Sulfonated PPO, FH = PVF$_2$ (MW = 350,000)

What is claimed is:

1. In a polymer electrolyte membrane containing an ion-exchange polymer membrane, the improvement in which the ion-exchange membrane comprises a blend of a homogeneously sulfonated poly(phenylene oxide) and poly(vinylidene fluoride), the homogeneously sulfonated poly(phenylene oxide) having a chemical structure characterized by the following recurring unit:

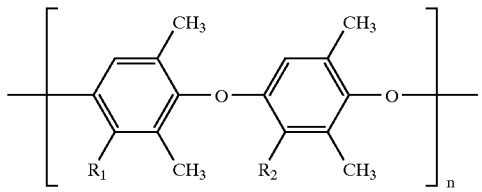

wherein R$_1$ and R$_2$ are each selected from the group consisting of H, SO$_3$H and SO$_3$M; and M is a metal selected from the group consisting of an alkaline metal, an alkaline earth metal and a transition metal, and n is an integer greater than 40, the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly(vinylidene fluoride) in the blend being between about 1 to 1 and about 20 to 1.

2. The polymer electrolyte membrane of claim 1, wherein in said homogeneously sulfonated poly(phenylene oxide), said alkali metal is Li$^+$, Na$^+$or K$^+$.

3. The polymer electrolyte membrane of claim 1, wherein said homogeneously sulfonated poly(phenylene oxide) has a number average molecular weight between about 30,000 and about 10,000,000.

4. The polymer electrolyte membrane of claim 1, wherein said homogeneously sulfonated poly(phenylene oxide) polymer has an ion-exchange capacity between about 2 and about 3.5 meq/g.

5. The polymer electrolyte membrane of claim 1, wherein said weight ratio is between about 4 to 1 and about 6 to 1.

6. In a solid polymer electrolyte fuel cell containing a ion-exchange polymer membrane as electrolyte sandwiched between an electrochemically reactive porous anode and cathode, the improvement in which the ion-exchange polymer membrane comprises a blend of a homogeneously sulfonated poly(phenylene oxide) and poly(vinylidene fluoride), the homogeneously sulfonated poly(phenylene oxide) having a chemical structure characterized by the following recurring unit:

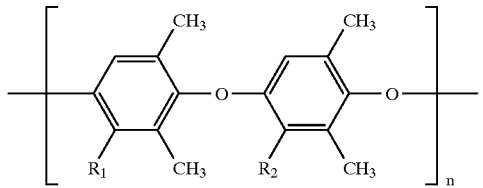

wherein R$_1$ and R$_2$ are each selected from the group consisting of H, SO$_3$H and SO$_3$M; wherein n is an integer greater than 40; and M is a metal selected from the group consisting of an alkaline metal, an alkaline earth metal and a transition metal, the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly(vinylidene fluoride) being between about 1 to 1 and about 20 to 1, the fuel cell capable of having a current density between about 1 A/cm$^2$ and about 2 A/cm$^2$ at 0.5 V, while using a minimum catalyst loading equivalent to between 0.1 mg/cm$^2$ and 0.2 mg/cm$^2$ of platinum on a platinum/carbon polytetrafluoroethylene electrode at 30 psi reactant gases, and a cell temperature between 45° C. and 85° C.

7. The polymer electrolyte fuel cell of claim 6, wherein said homogeneously sulfonated poly(phenylene oxide) has a number average molecular weight between about 30,000 and about 10,000,000.

8. The polymer electrolyte fuel cell of claim 6, wherein said homogeneously sulfonated poly(phenylene oxide) polymer has an ion exchange capacity between about 2 and about 3.5 meq/g.

9. The polymer electrolyte fuel cell of claim 6, wherein said weight ratio is between about 4 to 1 and about 6 to 1.

10. A blend ion-exchange membrane for electrochemical cells comprised of a blend of sulfonated ion exchange poly(phenylene oxide) and poly(vinylidene fluoride), the sulfonated poly(phenylene oxide) having a chemical structure characterized by the following recurring unit:

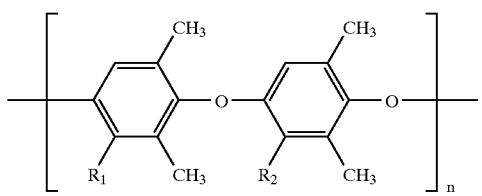

wherein $R_1$, and $R_2$ is selected from the group consisting of H, $SO_3H$ and $SO_3M$; wherein n is an integer greater than 40; and M is a metal selected from the group consisting of an alkaline metal, an alkaline earth metal and a transition metal, the sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of sulfonated poly (phenylene oxide) to poly(vinylidene fluoride) being between about 1 to 1 and about 20 to 1, the blend being prepared by the following process steps:

a. separately dissolving sulfonated poly(phenylene oxide) and poly(vinylidene fluoride) in respective solvents;

b. mixing the polymer solutions together in a weight ratio of sulfonated poly(phenylene oxide) to poly(vinylidene fluoride) between about 1 to 1 and about 20 to 1 to form a blend solution;

c. casting said blend solution onto a clean surface; and d. drying the cast blend solution for a time sufficient to evaporate the solvent(s) and form a dry blend membrane having a thickness between about 10 micrometers and about 200 micrometers.

11. A blend membrane according to claim 10, wherein said solvent for making blends is a solvent selected from methanol, ethanol, isopropanol, dimethyl formamide, dimethyl sulfoxide N-methyl pyrrolidone, acetone, methylethylketone, THF dimethylcellosolve and mixtures thereof.

12. A blend membrane according to claim 10, wherein said concentration of polymers in the solution is between 1 and 50 wt %.

13. A blend membrane according to claim 10, wherein said ion exchange membrane can be crosslinked by γ-ray or UV radiation, and/or by dry heat treatment.

14. A blend membrane according to claim 10, wherein said membrane thickness is between 40 $\mu$m and 150 $\mu$m.

* * * * *